United States Patent
Kennedy et al.

(10) Patent No.: US 8,032,149 B2
(45) Date of Patent: *Oct. 4, 2011

(54) TASKING AND REPORTING METHOD AND IMPLEMENTATION FOR WIRELESS APPLIANCE LOCATION SYSTEMS

(75) Inventors: Joseph P. Kennedy, Great Falls, VA (US); Thomas Booker Gravely, Herndon, VA (US); Andrew Beck, Ashburn, VA (US)

(73) Assignee: Andrew LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/230,333

(22) Filed: Aug. 29, 2002

(65) Prior Publication Data

US 2004/0043775 A1    Mar. 4, 2004

(51) Int. Cl.
    *H04W 4/00* (2009.01)
(52) U.S. Cl. .................. 455/456.1; 455/456.5; 455/406
(58) Field of Classification Search .... 455/404.1–404.2, 455/456.1–457, 426.1, 448, 454, 552.1, 432.1–433, 455/435.1–435.2, 456, 406, 560; 370/352
See application file for complete search history.

(56) References Cited

U.S. PATENT DOCUMENTS

| | | | |
|---|---|---|---|
| 4,728,959 A | 3/1988 | Maloney et al. | |
| 4,845,504 A | 7/1989 | Roberts et al. | |
| 4,891,650 A | 1/1990 | Sheffer | |
| 5,056,106 A | 10/1991 | Wang et al. | |
| 5,218,618 A | 6/1993 | Sagey | |
| 5,317,323 A | 5/1994 | Kennedy et al. | |
| 5,327,144 A | 7/1994 | Stilp et al. | |
| 5,365,544 A | 11/1994 | Schilling | |
| 5,404,376 A | 4/1995 | Dent | |
| 5,506,864 A | 4/1996 | Schilling | |
| 5,508,708 A | 4/1996 | Ghosh et al. | |
| 5,512,908 A | 4/1996 | Herrick | |
| 5,515,419 A | 5/1996 | Sheffer | |
| 5,519,760 A | 5/1996 | Borkowski et al. | |
| 5,592,180 A | 1/1997 | Yokev et al. | |
| 5,675,344 A | 10/1997 | Tong et al. | |
| 5,736,964 A | 4/1998 | Ghosh et al. | |
| 5,914,687 A | 6/1999 | Rose | |
| 5,945,948 A | 8/1999 | Buford et al. | |
| 5,959,580 A | 9/1999 | Maloney et al. | |
| 5,970,413 A | 10/1999 | Gilhousen | |
| 6,047,192 A | 4/2000 | Maloney et al. | |
| 6,097,336 A | 8/2000 | Stilp | |
| 6,108,555 A | 8/2000 | Maloney et al. | |
| 6,119,013 A | 9/2000 | Maloney et al. | |
| 6,127,975 A | 10/2000 | Maloney | |
| 6,184,829 B1 | 2/2001 | Stilp | |
| 6,191,738 B1 * | 2/2001 | Pfeil et al. ................ | 455/456.2 |
| 6,281,834 B1 | 8/2001 | Stilp | |
| 6,288,675 B1 | 9/2001 | Maloney | |
| 6,288,676 B1 | 9/2001 | Maloney | |
| 6,317,081 B1 | 11/2001 | Stilp | |
| 6,317,604 B1 | 11/2001 | Kovach, Jr. et al. | |
| 6,334,059 B1 | 12/2001 | Stilp et al. | |

(Continued)

*Primary Examiner* — Pierre-Louis Desir
(74) *Attorney, Agent, or Firm* — Duane Morris LLP

(57) ABSTRACT

A system and method for determining the location of a mobile appliance where the tasking of the system to determine the location of the mobile appliance utilizes a first communications protocol standard and the reporting of the location of the mobile appliance utilizes a second communications protocol standard, where the first and second communication protocol standards are not the same and can include any of the commonly used communication protocol standards including TIA defined standards, ETSI standards, and SMR/ESMR defined standards.

11 Claims, 3 Drawing Sheets

U.S. PATENT DOCUMENTS

| | | |
|---|---|---|
| 6,366,241 B2 | 4/2002 | Pack et al. |
| 6,400,320 B1 | 6/2002 | Stilp et al. |
| 6,463,290 B1 | 10/2002 | Stilp et al. |
| 6,571,082 B1 * | 5/2003 | Rahman et al. ............ 455/456.1 |
| 6,603,761 B1 * | 8/2003 | Wang et al. .................... 370/331 |
| 6,640,106 B2 * | 10/2003 | Gutowski et al. .......... 455/456.1 |
| 6,646,604 B2 | 11/2003 | Anderson |
| 6,912,230 B1 * | 6/2005 | Salkini et al. ................. 370/466 |

* cited by examiner

TASKING AND REPORTING METHOD AND IMPLEMENTATION FOR WIRELESS APPLIANCE LOCATION SYSTEMS

BACKGROUND

Applicant's disclosure is directed to a wireless communications network overlay for determining the location of mobile appliances.

The use of wireless communication devices such as telephones, pagers, personal digital assistants, laptop computers, etc., hereinafter referred to collectively as "mobile appliances", has become prevalent in today's society. Recently, at the urging of public safety groups, there has been increased interest in technology which can determine the geographic position, or "geolocate" a mobile appliance in certain circumstances. For example, the Federal Communication Commission (FCC) has issued a geolocation mandate for providers of wireless telephone communication services that puts in place a schedule and an accuracy standard under which the providers of wireless communications must implement geolocation technology for wireless telephones when used to make a 911 emergency telephone call (FCC 94-102 E911).

In addition to E911 emergency related issues, wireless telecommunications providers are developing location-enabled services for their subscribers including roadside assistance, turn-by-turn driving directions, concierge services, location-specific billing rates and location-specific advertising.

To support FCC E911 rules to locate wireless 911 callers, as well as the location enabled services, the providers of wireless communication services are installing mobile appliance location capabilities into their networks. In operation, these network overlay location systems take measurements on RF transmissions from mobile appliances at base station locations surrounding the mobile appliance, and estimate the location of the mobile appliance with respect to the base stations. Because the geographic location of the base stations is known, the determination of the location of the mobile appliance with respect to the base station permits the geographic location of the mobile appliance to be determined. The RF measurements of the transmitted signal at the base stations can include the time of arrival, the angle of arrival, the signal power, or the unique/repeatable radio propagation path (radio fingerprinting) derivable features. In addition, the geolocation systems can also use collateral information, e.g., information other than that derived for the RF measurement to assist in the geolocation of the mobile appliance, i.e., location of roads, dead-reckoning, topography, map matching etc.

In a network-based geolocation system, the mobile appliance to be located is typically identified and radio channel assignments determined by (a) monitoring the control information transmitted on radio channel for telephone calls being placed by the mobile appliance to detect calls of interest, i.e., 911, (b) a location request provided by a non-mobile appliance source, i.e., an enhanced services provider. Once a mobile appliance to be located has been identified and radio channel assignments determined, the location determining system is first tasked to determine the geolocation of the mobile appliance, and then directed to report the determined position to an appropriate mobile call center or enhanced services provider.

Mobile appliances do not all operate using a common wireless air interface protocol standard. The Telecommunications Industry of America (TIA) and the European Telecommunications Standard Institute (ETSI) are well known standards organizations, each publishing recognized wireless air interface protocol standards. In the past, mobile appliance geolocation systems have been specific to the underlying wireless air interface protocol standard utilized by the mobile appliance being located. Thus, both TIA and ETSI have published geolocation protocol standards for use with their respective wireless air interface communication protocol standards.

The monitoring of the RF transmissions from the mobile appliance to identify calls of interest is known as "tipping", and generally involves recognizing a call of interest being made from a mobile appliance and collecting the call setup information. Once the mobile appliance is identified and the call setup information is collected, the location determining system can be tasked to geolocate the mobile appliance.

Various methods have been developed to define and coordinate the tasking and reporting functions. One such method involves tasking only and is described in U.S. Pat. No. 5,327,144 to Stilp. This method detects telephone calls of interest by monitoring the control channels of a wireless communication system off-the-air, i.e., receiving RF signals transmitted by the telephones, and detecting call initiations and associated call set-up information directly from the RF signals.

As discussed above, other methods of tasking and/or reporting the location of a mobile appliance can be found in well known geolocation protocol standards published by two recognized standards bodies. The TIA and ETSI each publishes its own standard for tasking and reporting the geolocation of a mobile appliance and define network entities, reference models, and interfaces required to support the geolocation of the mobile appliance.

In the case of a mobile appliance location determining system for use with TIA defined air interfaces, the call setup information includes assigned frequency, time slot or code set is transmitted on a dedicated control channels. For TIA wireless air interface protocol standards, tipping can be accomplished off-the-air by monitoring the dedicated control channel to capture the call setup information, or via wireline interfaces defined in TIA geolocation standards containing tasking messages and data.

In the case of a location determining system for mobile appliances using ETSI defined air interfaces, such as GSM, the call set-up information is transmitted on dynamically allocated control channels on a per-call basis. The call set-up information may also be encrypted. Thus, the ability to identify calls of interest and collect call-set up information off-the-air would require expensive radio processing and decryption resources. As a result, off-the-air tipping is not practical with ETSI defined air interfaces. Instead, the ETSI geolocation standard requires that tipping be accomplished only through messaging on wireline transmissions between network entities, and in some instances requires the mobile appliance to transmit a dedicated location signal to facilitate the geolocation of the mobile appliance.

Presently, wireless communication systems are being deployed in the United States, which operate in accordance with the TIA air interface protocol standard, the ETSI air interface protocol standard, or several other recognized standards, including some proprietary systems such as those used for specialized mobile radio (SMR) and enhanced special mobile radio (ESMR). However, until now, there has not been developed an independent network overlay for determining the location of a mobile appliance for use with the multiple dissimilar wireless air interface protocol standards due, in part, to the nature of the underlying air interfaces. Specifically, the ETSI wireless air interface standard has characteristics, such as control channel allocation and encryption, that make it more difficult for independent network overlay equipment to successfully operate. As a result, the typical geolocation system is oriented to a specific wireless air interface protocol standard, and thus the same geolocation system can not be used to locate two different mobile appliances if the mobile appliances do not operate in networks using a common wireless air interface protocol standard.

The present disclosure is directed to a geolocation and method for locating a mobile appliance without regard to the wireless air interface protocol standard utilized by the mobile appliance. For example, in one embodiment of applicant's disclosure, the tasking is accomplished by monitoring interface points within the existing wireless network (physically wired connections) in a GSM wireless air interface system to determine that a call of interest has been placed and gather associated call set up information to allow a location estimate for the mobile appliance to be determined, and the reporting of the location determination is accomplished using the TIA defined interfaces. The interface point from where tasking is derived is a wireless air interface protocol standard "open interface", and not specific to one of the geolocation protocol standards.

Accordingly, it is an object of the present disclosure to provide a novel system and method for tasking and reporting the geolocation of a mobile appliance.

It is another object of the present disclosure to provide a novel system and method for geolocating a mobile appliance that is compatible with dissimilar wireless air interface protocol standards.

It is yet another object of the present disclosure to provide a novel system and method for tasking and reporting the geolocation of a mobile appliance using entities operating under different wireless air interface protocol standards.

It is still another the object of the present disclosure to provide a novel system and method for determining the location of a mobile appliance in a GSM wireless air interface system without using the GSM location determining protocol standard.

These and many other objects and advantages of the present invention will be readily apparent to one skilled in the art to which the disclosure pertains from a perusal of the claims, the appended drawings, and the following detailed description of the preferred embodiments.

DESCRIPTION OF THE PREFERRED EMBODIMENTS

To support the interfacing of the recently required location determining capability into existing, and planned, wireless networks, well known standards bodies have undertaken the task of defining network reference models, interfaces and location methodologies to support the geolocation requirement. The two principal standards bodies are the Telecommunications Industries Association (TIA) in the United States, and the European Telecommunications Standards Institute (ETSI) in Europe.

The TIA has defined a geolocation standard called TIA Standard 36 (TIA J-Std-36) which provides information to allow network overlay location systems to interface with existing TIA defined wireless air interface networks commonly used in the United States.

The ETSI publishes its own geolocation standard for tasking and reporting. For example, the ETSI standard titled "Digital Cellular Telecommunications System Location Services" GSM 3.71, provides information to allow network overlay location systems to interface with existing Global System for Mobile Communications (GSM) defined wireless communications networks commonly used in Europe, and being used more recently in the United States.

These published geolocation standards by TIA and ETSI define network entities, reference models, and interfaces to allow mobile appliance location determining tasking and reporting.

Figure 1:
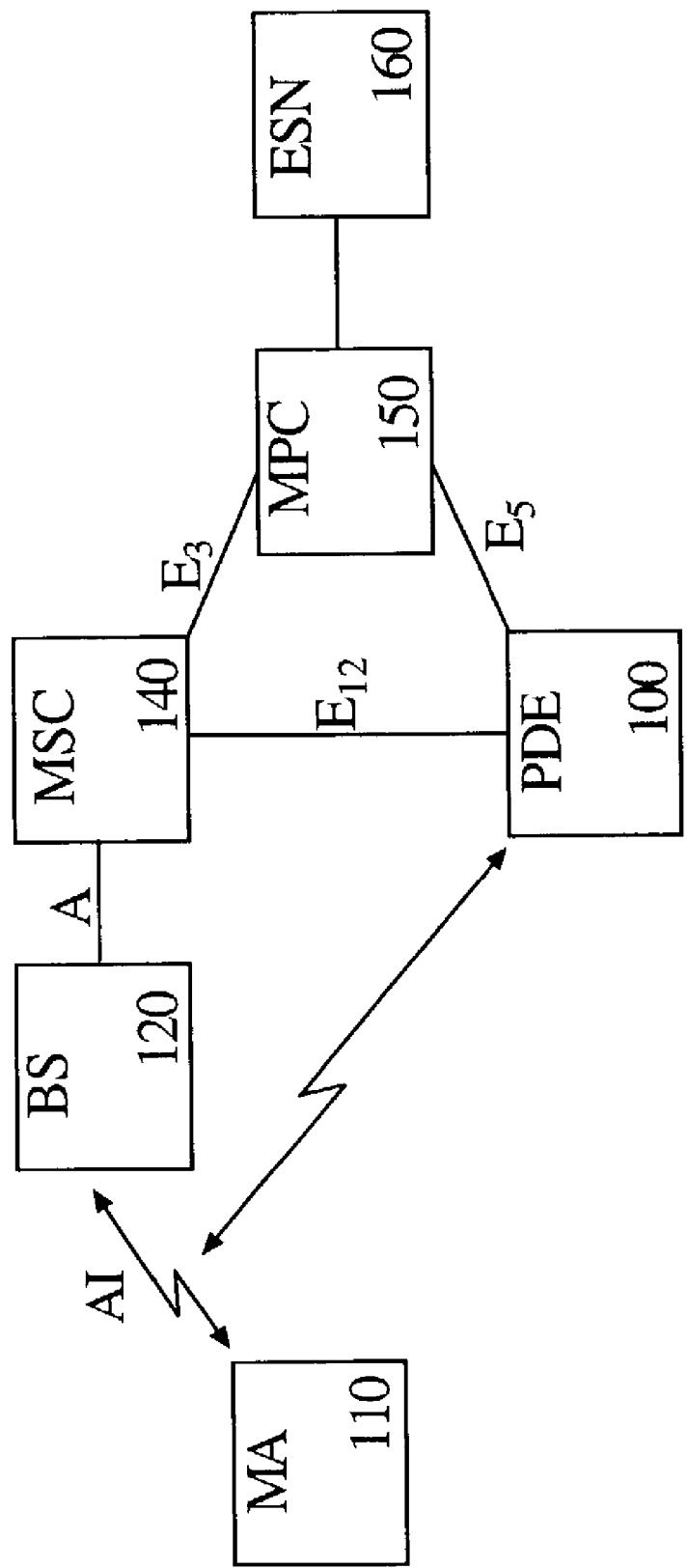
FIG. 1 is a simplified block diagram illustrating a TIA defined geolocation system (TIA-J-STD-036) for use with mobile appliances governed by TIA wireless air interface protocol standards.

FIG. 1 illustrates the TIA geolocation protocol standard J-Std-36 for network overlay location systems to interface with existing communication networks in the United States. The geolocation standard covers air interfaces commonly used in the U.S such as AMPS, IS-136, and J-Std-008. For the TIA defined air interfaces, control information for call setup and management is contained on a dedicated channel and contains assigned frequency/time slot/code set information. Tasking for the network overlay location determining system can be accomplished by off-the-air monitoring. Off the air tasking requires radio receiving and processing resources in order to identify the RF channels/time slots/code sets. In the TIA geolocation standards, tasking can also be accomplished over a wireline interface defined by the geolocation standards. The PDE 100 is connected to the Mobile Switching Center (MSC) 140 and the Mobile Positioning Center (MPC) 150 via wireline interfaces E12 and E5, respectively. The MSC 140 is connected to the MPC 150 via a wireline interface E3.

In operation, the Position Determining Equipment (PDE) 100 may monitor the air interface (AI) between the mobile appliance 120 and the base station 130 to receive the call setup information. The PDE 100 may also receive call setup information from the MPC 150 via the E5 interface. The PDE 100 takes measurements on the RF signals as described previously and determines the location of the mobile appliance 120. The MPC 150 reports the location received from the PDE 100 to the Emergency Services Network. 160. The Emergency Services Network 160 may contain databases related to the communications network and emergency services network entities which are linked to PSAPs and enhanced services providers as is well known and therefore not discussed in detail in this disclosure.

Figure 2:
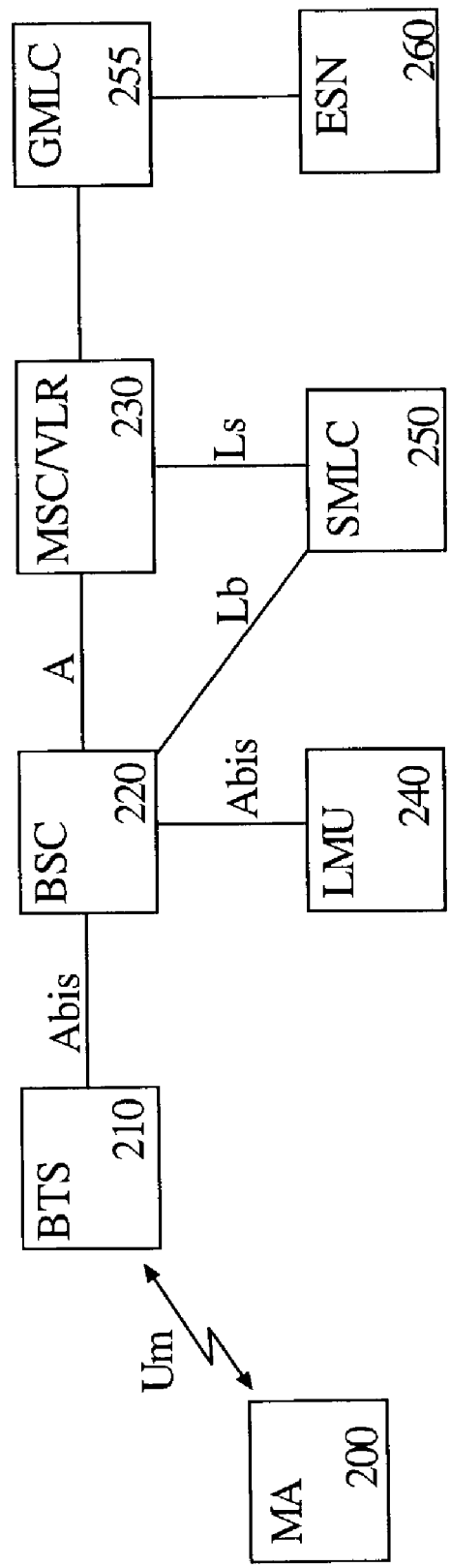
FIG. 2 is a simplified block diagram illustrating an ETSI defined geolocation system (GSM 3.71) mobile appliance location determining system for use with mobile appliances governed by ETSI wireless air interface protocol standards.

FIG. 2 is a simplified block diagram of a geolocation system in accordance with ETSI GSM 3.71 geolocation protocol standard. In the case of GSM, call set up information is present not only on dedicated control channels, but also on dynamically allocated control channels on a per-call basis. Further, this information may be encrypted. Thus, this protocol standard requires that call information be captured from a wireline interface after the RF signal is received at the base station rather than off-the-air.

Mobile Station (MS) 200 communicates with the Base Transceiver Station (BTS) 210 via wireless interface Um. The Base Station Controller (BSC) 220 manages radio resource including the BTS 210 via wireline interface Abis. The Abis interface is an open interface completely defined as part of the ETSI specification for GSM and carries the call set up information, including voice channel assignments between the BSC 220 and BTS 210. The Mobile Switching Center/Visitor's Location Register (MSC/VLR) 230 coordinates between the mobile appliance communications network, the Global Mobile Location Center (GMLC) 255 and the Emergency Services Network (ESN) 260.

In operation, the Location Measurement Unit (LMU) 240 may be connected to the BSC 220 via the Abis wireline interface and makes measurements on the RF signals on the Um interface, along with other measurements to support one or more of the positioning methods described previously. The measurements from one or more LMUs 240 are sent to a Serving Mobile Location Center (SMLC) 250 via BCS 220 where the position of MS 200 can be determined.

One significant difference between the TIA and ETSI geolocation standards is in the degree to which independent network overlay systems can conform to the defined communication reference model. The TIA geolocation standard is well suited to independent overlays, while the ETSI geolocation standard requires much more interaction and integration with the existing communication networks. In part, this is due to the nature of the underlying air interfaces. The GSM air interface has characteristics that make it more difficult for independent network overlay equipment to successfully operate. These characteristics include the heavy use of encryption and the mechanism by which calls are set up and managed through control channels.

For example, a network overlay solution attempting to detect calls of interests and collect call set up data from a GSM defined system to allow location determination would need to provide radio and processing resources to respond to all of the dynamically allocated control channels, as well as obtain encryption key information.

Additionally, the ETSI geolocation standard does not provide a well defined external interface to an existing GSM communications network for network overlay location system tasking or reporting. Thus, it is difficult to provide an independent network overlay location system for GSM defined systems within location oriented standards reference models, or via off the air monitoring.

Figure 3:
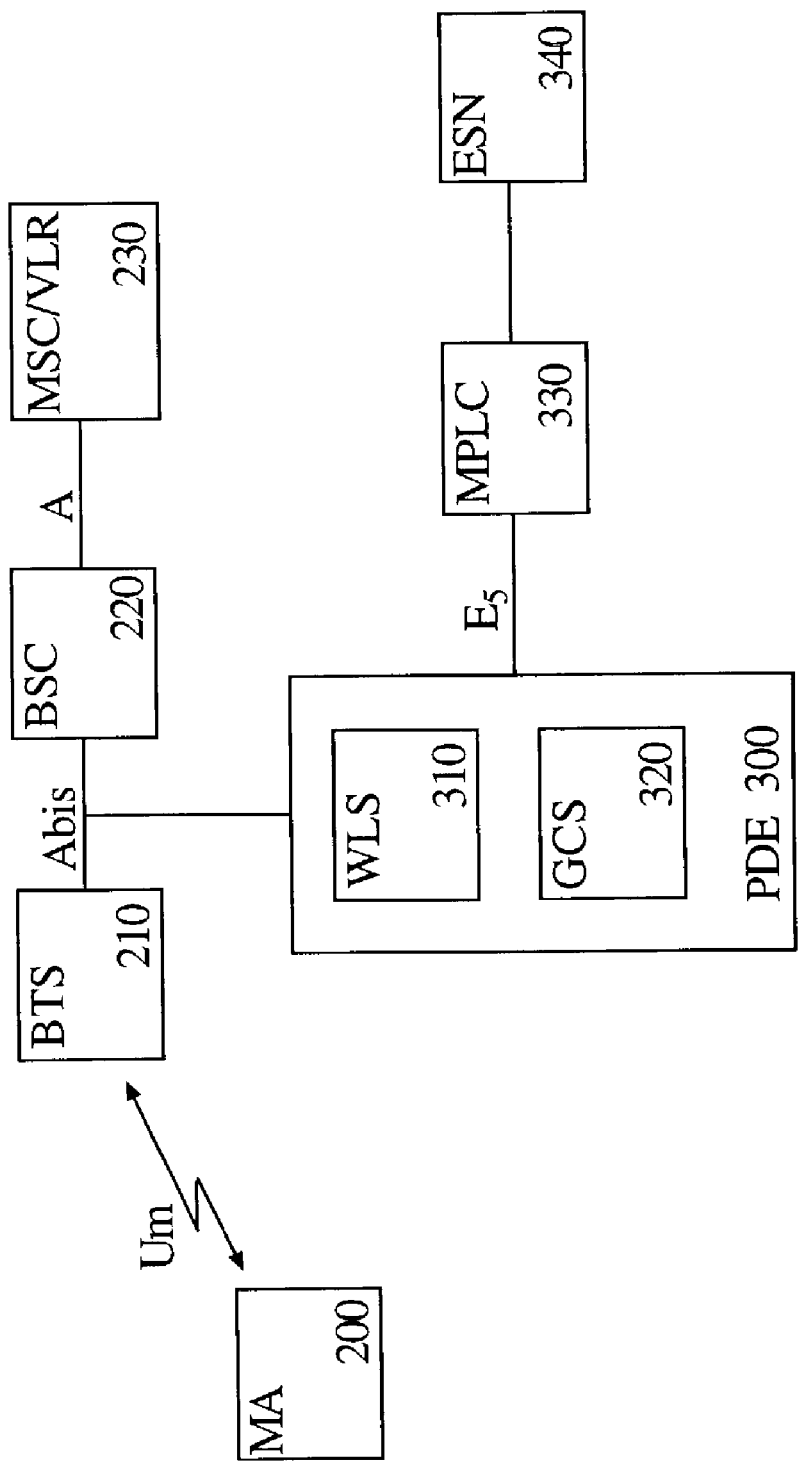
FIG. 3 is a simplified block diagram of applicant's wireless geolocation system utilizing portions of the TIA and ETSI defined entities illustrated in FIGS. 1 and 2, respectively.

FIG. 3 is a simplified pictorial diagram of one embodiment of applicant's overlay location determination system for use with a communication system defined by ETSI or TIA wireless air interface protocol standards using elements from each.

The MA 200, BTS 210, BSC 220 and MSC/VLR 230 are network entities from the ETSI GSM wireless air interface protocol standard. These entities form the basic GSM wireless air interface network and do not include the additional entities necessary for location determination as defined by the GSM geolocation standards.

PDE 300 provides the location estimates for the mobile appliance 200. PDE 300 contains a Wireless Location System (WLS) 310 and Geolocation Control System (GCS) 320 which provide LMU and SMLC functionality, respectively.

The interfaces between elements are also derived from the specific wireless air interface protocols, with Um defining the GSM air interface, A and Abis defining wireline GSM interfaces, and E5, E2 and E11 representing TIA wireline interfaces.

In operation, mobile appliance 200 may place a call during which the location of the mobile appliance is desired (i.e. E911 is dialed). The BTS 210, BSC 220, MCS/VLR 230 receive the call request on logical control channels, perform the necessary steps to authenticate the user, and connect the call using GSM defined protocols. The call service request including dialed number are made available via the Abis interface to the PDE 300. The Abis interface is an open interface completely defined as part of the ETSI specification for GSM. The call set up information including voice channel assignment details are also made available via the Abis interface. The PDE 300 monitors the Abis interface to detect calls of interest (i.e. E911 calls), and when detected, reads the call setup information. The PDE 300 uses the call setup information to collect RF emissions from the mobile appliance 200, and calculates a location estimate using one of the well known techniques mentioned above. The PDE 300 reports the call occurrence (along with the caller identity), and the location estimate through the E5 interface to the Mobile Positioning Location Center (MPLC) 330. This "push" mode of reporting is supported in J-Std-036. The MPLC 330 performs the call routing and sends location and other information to emergency services network 340 or other value added services applications.

The Abis interface monitoring can be done within the WLS 310. This is convenient since the WLS 310 may be co-located with the BTS 210 in many cases. The Abis interface monitoring can also be done within the GCS 320. This is convenient since the GCS 320 may be co-located with the BTS 220 in many cases Thus, in one embodiment of applicant's disclosure a GSM defined wireless air interface system allows an independent network overlay location systems to be tasked via a GSM defined wireline interface and reported through a TIA defined interface. The tasking method does not rely on off the air signaling collection, nor on the GSM geolocation protocol standards. The tasking method can detect a call of interest initiation and capture call set up data necessary for traffic channel location without off-the-air receiving equipment or methods. The method requires no modifications to the underlying wireless infrastructure equipment to provide a specific tasking interface or reporting interface. Additionally, the tasking method does not rely on direct or indirect interfacing to the mobile switch.

In one embodiment of the present disclosure, the tasking method uses wireless air interface protocol standard defined interfaces. The method produces reporting that is J-Std-036 complaint for air interfaces not necessarily included in or supported by the J-Std-036 standard reference model, such as GSM air standards. This embodiment provides a convenient interface point, the WLS, within a current common network entity, the BTS, in location network overlay systems to interface to the wireless infrastructure equipment, the Abis interface, and relay data to GCS for tasking.

Thus, this embodiment describes a method of tasking a communications system defined by the GSM wireless air interface protocol to locate a mobile appliance and to report the determined location of the mobile appliance using the TIA defined entities. Note that although this disclosure has described protocols with respect to TIA and ETSI defined standards, this disclosure may be equally applicable to other defined standards such as the enhanced specialized mobile radio systems (ESMR) standards.

Unlike the typical wireless geolocation, applicant's disclosure is not specific to a particular wireless air interface protocol standard, and can be used to locate plural mobile appliances even if the mobile appliances are not operating using a common wireless air interface protocol standard. For example, one embodiment of applicant's disclosure may be used to locate a mobile appliance operating using a TIA defined air interface standard, and also may be used to locate a mobile appliance operating using a ETSI defined air interface standard.

While preferred embodiments of the present invention have been described, it is to be understood that the embodiments described are illustrative only and the scope of the invention is to be defined solely by the appended claims when accorded a full range of equivalents, many variations and modifications naturally occurring to those skilled in the art from a perusal hereof.

What is claimed:

1. A method of determining the location of a mobile appliance with positioning determining equipment (PDE) and providing the location to a mobile positioning location center (MPLC) in a wireless communication system having plural base stations for communicating with the mobile appliance and a base station controller for managing the plural base stations, comprising the steps of:
   (a) placing a call request from a mobile appliance;
   (b) processing the call request at the base station controller using a plurality of interfaces defined by a first predetermined wireless air interface communications protocol standard;
   (c) detecting a call of interest by monitoring one of the plurality of interfaces;
   (d) retrieving call request information for the detected call of interest;
   (e) identifying the mobile appliance to be located from the retrieved call and channel assignment request information;
   (f) determining the geographic coordinate location of the identified mobile appliance with the PDE;
   (g) reporting the determined geographic coordinate location of the identified mobile appliance from the PDE to the MPLC using a second predetermined wireless air interface communications protocol standard, where the first and second predetermined wireless air interface communication protocol standards are not the same wireless air interface communications protocol standards.

2. The method of Claim 1 wherein the first predetermined communications protocol standard is a Global System for Mobile Communications (GSM) air interface standard.

3. The method of claim 2 wherein the second communications protocol standard is a Telecommunications Industry Association (TIA) air interface standard.

4. The method of claim 3 wherein one of the plural interfaces is Abis.

5. A mobile appliance location determining system comprising:
   a mobile appliance;
   plural base stations for communication with the mobile appliance using an air interface defined by a first predetermined wireless air interface protocol standard;
   a base station controller operably connected to said plural base stations by a first wireline interface defined by said first predetermined wireless air interface communications protocol standard;
   positioning determining equipment (PDE) operably connected to said first wireline interface for receiving information from said plural base stations and for determining the geographic coordinate location of the mobile appliance as a function of the information received via said wireline interface;
   a mobile positioning location center generally connected to said PDE by a second wireline interface defined by a second predetermined wireless air interface protocol standard for receiving said determined geographic coordinate location therefrom, said second predetermined wireless air interface protocol standard differing from said first predetermined wireless air interface protocol standard.

6. The system of claim 5 wherein said first predetermined protocol standard is a Global System for Mobile Communications (GSM) standard.

7. The system of claim 6 wherein said second predetermined protocol standard is a Telecommunications Industry Association (TIA) standard.

8. The system of claim 7 wherein said second wireline interface is E5.

9. The system of claim 6 wherein said first wireline interface is Abis.

10. The system of claim 5 wherein said first predetermined protocol standard is a Specialized Mobile Radio (SMR)/Enhanced Specialized Mobile Radio (ESMR) standard.

11. The system of claim 10 wherein said second predetermined protocol standard is a Telecommunications Industry Association (TIA) standard.